United States Patent [19]

Wagerer

[11] Patent Number: 5,184,163
[45] Date of Patent: Feb. 2, 1993

[54] REMOTE TRIGGER METHOD AND APPARATUS FOR A CAMERA SHUTTER

[75] Inventor: Helmut Wagerer, Des Plaines, Ill.

[73] Assignee: W. Haking Enterprises Limited, Hong Kong

[21] Appl. No.: 740,449

[22] Filed: Aug. 5, 1991

[51] Int. Cl.⁵ ............................................. G03B 17/38
[52] U.S. Cl. ...................................... 354/266; 354/131
[58] Field of Search ............... 354/266, 131, 267.1; 340/825.62, 825.63, 825.64, 825.69, 825.72, 825.77

[56] References Cited

U.S. PATENT DOCUMENTS 4,041,512  8/1977  Iwata et al. ........................ 354/234
4,937,604  6/1990  Yoshida et al. ..................... 354/266
5,066,948  11/1991  Kaneko ............................ 340/825.69

Primary Examiner—Michael L. Gellner
Assistant Examiner—David M. Gray
Attorney, Agent, or Firm—Mason, Kolehmainen, Rathburn & Wyss

[57] ABSTRACT

A low-cost remote control triggering mechanism for the shutter of a camera utilizes a remote control transmitter that utilizes a pulsed light emitting diode transmitter to generate triggering pulses having a predetermined pulse width and pulse spacing. A receiver at the camera receives the pulses and utilizes filtering, threshold detection and pulse width and interval criteria to distinguish triggering pulses from ambient light sources.

3 Claims, 1 Drawing Sheet

REMOTE TRIGGER METHOD AND APPARATUS FOR A CAMERA SHUTTER

BACKGROUND OF THE INVENTION

1. Field of the Invention

This invention relates generally to remote control devices and, more particularly, to simple, lowcost infrared control devices particularly useful for triggering the release of a camera shutter.

2. Description of the Prior Art

Various remote control devices suitable for remotely controlling the operation of a camera shutter are known. Such systems have used radio waves, acoustic waves and light beams including infrared light beams to control a shutter release remotely. Examples of radio wave controlled systems are disclosed in U.S. Pat. Nos. 3,148,330; 3,805,281; 3,922,961; 3,961,342; 4,433,903 and 4,801,959, while an example of an acoustically controlled system is disclosed in U.S. Pat. No. 4,290,685. Examples of light controlled systems are disclosed in U.S. Pat. Nos. 4,048,540; 4,091,398; 4,707,127 and 5,014,080. The '540 and '398 patents describe flash attachments that operate at a high output level for flash photography and at a low level to serve as a remote control. The '127 and '080 patents describe remote control shutter release systems that utilize light emitting diodes as a source of light or infrared energy. Infrared control systems are also commonly utilized to control the operation of television receivers, video cassette recorders and associated peripheral equipment.

While all of the above-described systems provide a way to control a shutter release mechanism automatically, radio systems are relatively complex and care must be taken to prevent the radio frequency waves that are generated by such systems from interfering with other electronic devices in the area. Approval of such systems by the Federal Communications Commission may also be required and such approval may be time consuming and costly to obtain. Acoustic systems may be in the supersonic or audible range, with older systems being in the audible range and utilizing tuning forks or bars or the like to generate the control signal mechanically. Later systems generated an ultrasonic signal electronically and utilized a transducer to convert the ultrasonic electrical signal to an acoustic signal. The disadvantages of the aforementioned acoustic systems were complexity, particularly in the mechanical systems, and a tendency for the acoustic transducers to become less efficient with time.

The device disclosed in U.S. Pat. No. 5,014,080 combines a shutter release function with a distance-to-subject determining system, but does not address the problems associated with inadvertently triggering the shutter due to ambient light sources. Another system such as the one described in U.S. Pat. No. 4,707,127 discloses a remote triggering system that is simple and inexpensive, but also does not address the problem of inadvertent triggering of the shutter by extraneous ambient light sources. Optical systems used to control devices such as radio and television receiving and recording systems require a multi-function signalling capability, and are consequently more complex than necessary for remote shutter release applications. Dual function photo flash devices are cumbersome and consume relatively large amounts of power and, consequently, are not well suited for remote control applications.

SUMMARY

Accordingly, it is an object of the present invention to provide a wireless remote shutter release system that overcomes many of the disadvantages of the prior art systems.

It is another object of the present invention to provide a wireless remote release for a camera shutter that is simple and inexpensive to manufacture.

It is another object of the present invention to provide a remote wireless shutter release system for a camera that is relatively insensitive to extraneous ambient light sources.

It is another object of the present invention to provide a remote control system that utilizes a transmitter that generates a pulsed optical beam having characteristics unlike that of ambient light sources to trigger a receiving device capable of discriminating between the transmitted pulsed signal and ambient light.

BRIEF DESCRIPTION OF THE DRAWING

These and other objects and advantages of the present invention will become readily apparent upon consideration of the following detailed description and attached drawing, wherein.

DESCRIPTION OF THE PREFERRED EMBODIMENT

Figure 1:
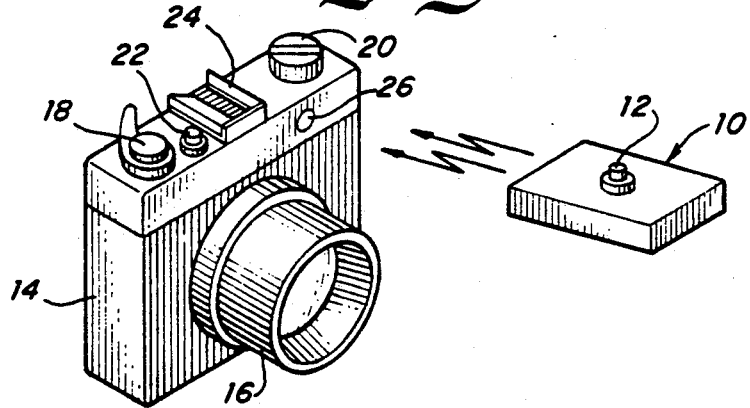
FIG. 1 is a perspective view of the remote triggering system according to the invention utilized in conjunction with a still camera.

Referring now to FIG. 1, there is shown a remote control triggering system according to the invention utilized to control the shutter release of a camera. Although the system according to the invention is illustrated in FIG. 1 and described herein in conjunction with a remote shutter release system, it should be understood that the system according to the invention can also be used for other applications. The remote control system utilizes a remote transmitter that emits light waves preferably in the infrared region upon the operation of a push-button switch 12. The transmitter 10 controls the operation of a camera 14 that has a conventional lens system 16, a film advance lever 18 (or a motor driven film advance, not shown), a film rewind knob 20 and a manual shutter release 22. The camera 14 may also have a hot shoe 24 capable of accepting a flash attachment (not shown) or may employ a integrally mounted flash. The camera 16 also contains an infrared light detector 26 that receives the infrared emissions from the transmitter 10 to permit the shutter of the camera 14 to be remotely triggered by the remote unit 10 upon actuation of the push-button switch 12. Thus, the shutter of the camera may be released either manually by operation of the manual shutter release 22 on the camera 14 or remotely by the remote triggering unit 10.

One of the problems associated with light triggered systems is that the light detector 26 is responsive to ambient light that includes sunlight that has a strong steady infrared component and also to incandescent and fluorescent light that contains an infrared component that is pulsed at twice the power line frequency, i.e., 120

Hz or 100 Hz depending on the power line frequency (60 or 50 Hz). Thus, the detection system has to be designed to reject steady and 120 or 100 Hz infrared components to avoid false triggering. Similarly, the remote transmitting unit must encode or modulate the signal to avoid the rejection criteria of the receiver.

Present systems utilized in remote shutter controls utilize a two-stage modulation system to provide the encoding. In such systems, the infrared light beam is utilized as a carrier beam that is modulated at a rate in the range of 50 kHz to generate a 50 kHz subcarrier. The subcarrier is then modulated at approximately 1 kHz to provide the encoding. This permits the receiver to be narrowly tuned to 50 kHz to thereby reject 120 or 100 Hz signals. The subcarrier is then demodulated and the detection of the 1 kHz signal can be utilized to verify that a trigger of the shutter release is desired. Also, modulating the subcarrier with different frequencies or codes permits a number of functions to be controlled; however, the system is relatively complex and is better suited for use with multiple channel systems such as television and VCR remote controls.

The system according to the invention avoids the problems of discriminating between a transmitted signal and ambient light without resorting to the complexity of the prior art systems. In the system according to the invention, the 50 kHz or other frequency subcarrier is eliminated and the carrier itself is modulated with pulses for example, at about 500 Hz to permit discrimination between the 500 Hz transmitted pulses and the ambient 120 or 100 Hz signal. Discrimination between ambient signals and transmitted pulses is achieved at the receiver by high pass filtering, threshold detection and pulse interval detection. Thus, the high pass filtering serves to attenuate ambient signals to a level below the threshold of the threshold detector. In extremely strong ambient light conditions where the ambient signal is strong enough to exceed the threshold of the threshold detector, the pulse interval detection determines whether the received pulses have the correct time interval (2 milliseconds for the 500 Hz example) or a substantially longer interval (8.33 milliseconds for a 60 Hz power line frequency). The pulse interval detection may be achieved by various timing systems, but conveniently a microprocessor may be used.

Figure 2:
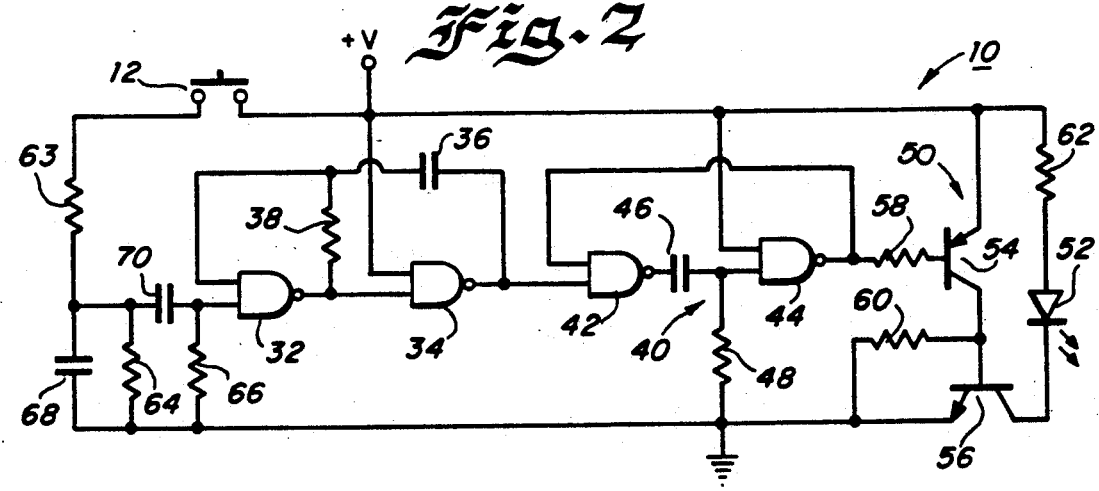
FIG. 2 is a schematic diagram of the remote control transmitting unit illustrated in FIG. 1.
Figure 3:
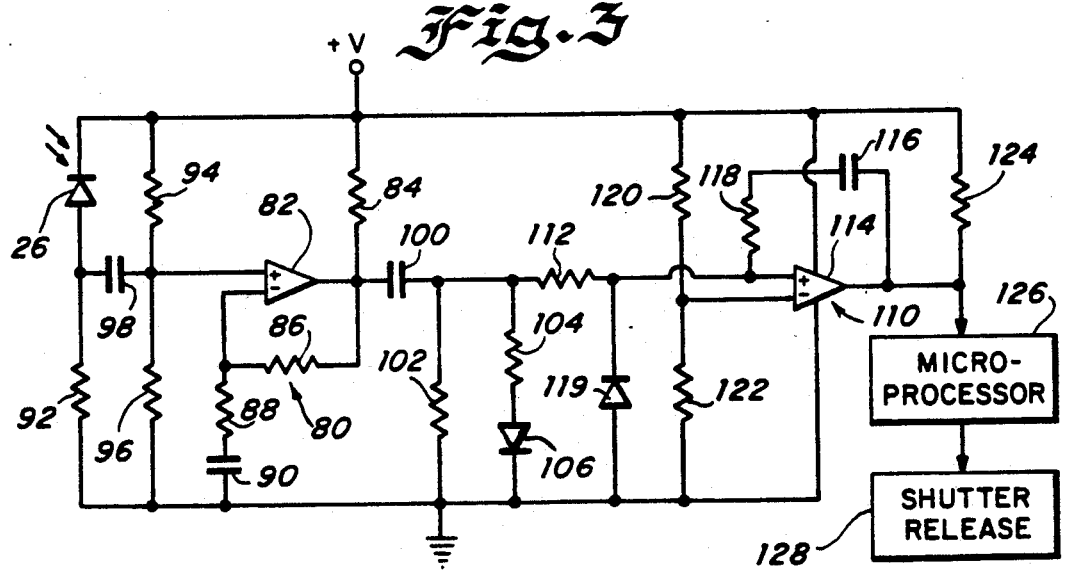
FIG. 3 is a schematic diagram of the remote receiving unit that receives signals from the transmitting unit and releases the shutter upon command from the remote unit.

Referring now to FIG. 2, there is shown a schematic diagram of the transmitter 10. The transmitter 10 contains a signal generation section and an output section. The signal generation section includes an oscillator 30 including a pair of NAND gates 32 and 34, a capacitor 36 and a resistor 38. When triggered, the oscillator 30 generates a square wave signal at a 500 Hz frequency at the output of the NAND gate 34. While a frequency of 500 Hz is used in the present embodiment, any frequency sufficiently removed from naturally occurring ambient frequencies may be used. Also, different frequencies may be used to control different functions in a multiple channel system.

The output of the oscillator 30 is connected to a monostable multivibrator comprising a pair of NAND gates 42 and 44 and timing network comprising a capacitor 46 and a resistor 48. An output section 50 comprises a light emitting diode 52 (preferably an infrared light emitting diode such as, for example, a Type TLN115diode manufactured by Toshiba Electric, Inc.), a pair of amplifier and driver transistors 54 and 56, a coupling resistor 58, a biasing resistor 60 and a current limiting resistor 62.

The operation of the transmitter 10 is initiated by closing the push-button switch 12 to thereby apply a voltage to a resistor capacitor network comprising resistors 63, 64 and 66 and capacitors 68 and 70. Closing the switch 12 rapidly charges the capacitor 68 and applies a positive voltage to the capacitor 70 which together with the resistor 66 forms a high pass network having a time constant of approximately 50 milliseconds. This results in a positive voltage at the junction of the capacitor 70 and the resistor 66 that exceeds the threshold voltage of the gate 32 for about 40 milliseconds and causes the oscillator 30 to oscillate for approximately 40 milliseconds to thereby provide approximately 20 cycles of the 500 Hz square wave at the output of the gate 34. The monostable multivibrator is triggered on positive transitions of the 500 Hz square wave signal to provide a pulse of 100 microseconds at the output of the gate 44 each time the monostable multivibrator 40 is triggered. This results in an output of approximately 20 pulses of 100 microsecond duration spaced by approximately two milliseconds (for a system operating at 500 Hz) at the output of the gate 44 each time the push-button switch 12 is depressed. The approximately 20 pulses from the monostable multi-vibrator 40 are applied to the transistor 54 via the resistor 58. The transistor 54 amplifies the pulses and applies them to the transistor 56 that drives the light emitting diode 52. Consequently, the light emitting diode 52 is pulsed for 20 pulses with pulses having a 100 microsecond duration and spaced by approximately 2 milliseconds. The current limiting diode 62 limits the current through the light emitting diode 52 to approximately 0.5 amperes for each pulse. Since the on-time of the current through the light emitting diode 52 is only approximately 5% of the pulse interval, the average current through the light emitting diode is 0.025 amperes, thus conserving battery power while permitting a high value of peak output for the light from the diode 52.

The receiver portion of the system analyzes the amplitude, repetition rate and width of the received pulses to determine whether the received pulses were transmitted by the transmitter 10 or were generated by ambient conditions. The receiver portion utilizes a high pass filter 80 that utilizes an amplifier 82 that cooperates with resistors 84, 86 and 88 and a capacitor 90 to form a high pass filter, with the resistor 84 serving as a pull-up resistor that prevents the amplifier 82 from saturating and causing a bias shift that can trigger subsequent stages. The high pass filter circuit 80 is connected to the photodiode detector 26 that receives the pulses from the transmitter 10 and applies them to the high pass filter 80 via a resistance capacitance network including resistors 92, 94 and 96 and a capacitor 98. The capacitor 98 capacitively couples the signal from the photodiode detector 26 to the amplifier 82 of the high pass filter circuit 80 further to reject direct current components of the infrared signal generated by the sun as well as low frequency infrared components generated by artificial light.

Because of the AC coupling and the high pass filtering, the output of the amplifier 82 contains primarily frequency components in the range of frequencies generated by the transmitter 10. However, in order to permit AC coupling with a single-supply operational amplifier, the amplifier has been biased in a positive direction by the resistors 94 and 96. This causes the output of the amplifier to be biased by approximately the same amount. Consequently, the signal from the amplifier 82 is AC coupled via a coupling capacitor 100 to a partial clamping network comprising a pair of resistors 102 and 104 and a diode 106. As a result, the signal appearing at the junction of the capacitor 100 and the resistors 102 and 104 is referenced to ground by the diode 106 and permits the voltage at the afore-mentioned junction to go negative. The partial clamping network utilizes some of the energy of the positive pulse to shift the voltage waveform occurring in the interval between pulses in a more negative direction so that inadvertent triggering of the comparator is avoided.

The signal from the capacitor 100 is coupled to a comparator circuit 110 via a coupling resistor 112. The comparator 110 includes an amplifier 114 having a positive feedback loop including a capacitor 116 and a resistor 118 that serves to square up the signal from the resistor 112. The capacitor 116 also makes the comparator 110 monostable, and the capacitor 116 and resistor 118 cooperate to maintain the pulse width at the output of the comparator 110 substantially constant. A diode 119 improves the slew rate of the amplifier. A pair of resistors 120 and 122 provide a threshold reference voltage to the amplifier 114 so that a pulsed signal appears at the junction of the output of the amplifier 114 and a resistor 124. Upon receipt of a signal transmitted by the transmitter 10 (FIG. 2), the output of the amplifier 114 should be a pulsed signal that has the same repetition rate and pulse width as the signal transmitted by the transmitter 10 provided that the threshold determined by the resistors 120 and 122 is exceeded.

Under most circumstances, any ambient signal whose frequency and pulse width characteristics are not the same as the characteristics transmitted by the transmitter 10 will be attenuated by the high pass filter circuit 80 and the input AC coupling to the high pass filter circuit 80. However, under extremely high amplitude ambient light conditions, the threshold established by the resistors 120 and 122 may be exceeded. Thus, the output of the amplifier 114 would be a signal having the pulse width and pulse separation characteristics of the ambient light. However, all signals from the amplifier 114 are applied to a microprocessor 126 (or other timing circuit) that analyzes the pulses from the amplifier 114 to determine whether the pulse width and pulse separation characteristics correspond to a signal transmitted by the transmitter 10. In the event that they have the correct characteristics, i.e., a pulse width of approximately 100 microseconds and spacing of approximately 2 milliseconds, they are recognized by the microprocessor 126 as trigger pulses. Upon receipt of such pulses, the microprocessor 126 triggers a shutter release 128 to thereby release the shutter of the camera 14. It is not necessary to examine all 20 pulses to determine the correct pulse interval. The interval between only a single pair of pulses need be examined particularly if a fast response is desired. If more noise rejection is desired, more than one interval between successive pulses may be examined. Pulses from the amplifier 114 having characteristics other than those of trigger pulses are not passed, and the shutter release is not activated.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A remote control shutter release system for a camera, comprising:
    a transmitter having a light emitting diode;
    means associated with said transmitter for energizing said light emitting diode to cause said diode to emit a predetermined number of pulses or light at a predetermined pulse width, amplitude and repetition rate;
    a shutter release within said camera; and
    means for discriminating between ambient light and pulses from said light emitting diode associated with said camera, said discriminating means including means for receiving said pulses, said receiving means including means responsive to said pulses for operating said shutter release upon the receipt of pulses exceeding a predetermined amplitude and having said predetermined pulse width and repetition rate, said receiving means including means including a light responsive diode for proving an electrical signal in response to received light pulses, means including a high pass filter coupled to said diode for receiving the electrical signal from said diode and attenuating components of the electrical signal resulting from ambient light to provide a filtered signal, means including an analog threshold comparator electrically coupled to said filter for receiving said filtered signal and providing an output pulse signal only if the filtered signal exceeds a predetermined amplitude determined by said analog threshold comparator, and means including a microprocessor coupled to said analog threshold comparator for receiving said output signal and determining the pulse width and repetition rate thereof and generating a shutter release signal only if the output pulse signal has a predetermined pulse width and a predetermined repetition rate;
    said diode energizing means including an oscillator having a frequency of oscillation that determines said predetermined repetition rate, and a pulse generator responsive to said oscillator for generating pulses having a predetermined pulse width at a repetition rate determined by said frequency of oscillation; and
    said transmitter including means for initiating operation of said oscillator, said initiating mean including manually operable means and means including timing means responsive to said manually operable means for operating said oscillator for a predetermined time interval.

2. A remote control shutter release system as recited in claim 1, wherein said predetermined pulse width is approximately 100 microseconds and said predetermined repetition rate is approximately 500 Hz.

3. A remote control shutter release system as recited in claim 2, wherein said predetermined time interval is approximately 40 milliseconds.

* * * * *